3,337,799
AUTOMATIC FREQUENCY ANALYZER USING PARALLEL ONE-THIRD OCTAVE FILTERS
Clarence A. Peterson, Tacoma, Wash., assignor to the United States of America as represented by the Secretary of the Navy
Filed Dec. 27, 1963, Ser. No. 334,056
3 Claims. (Cl. 324—77)

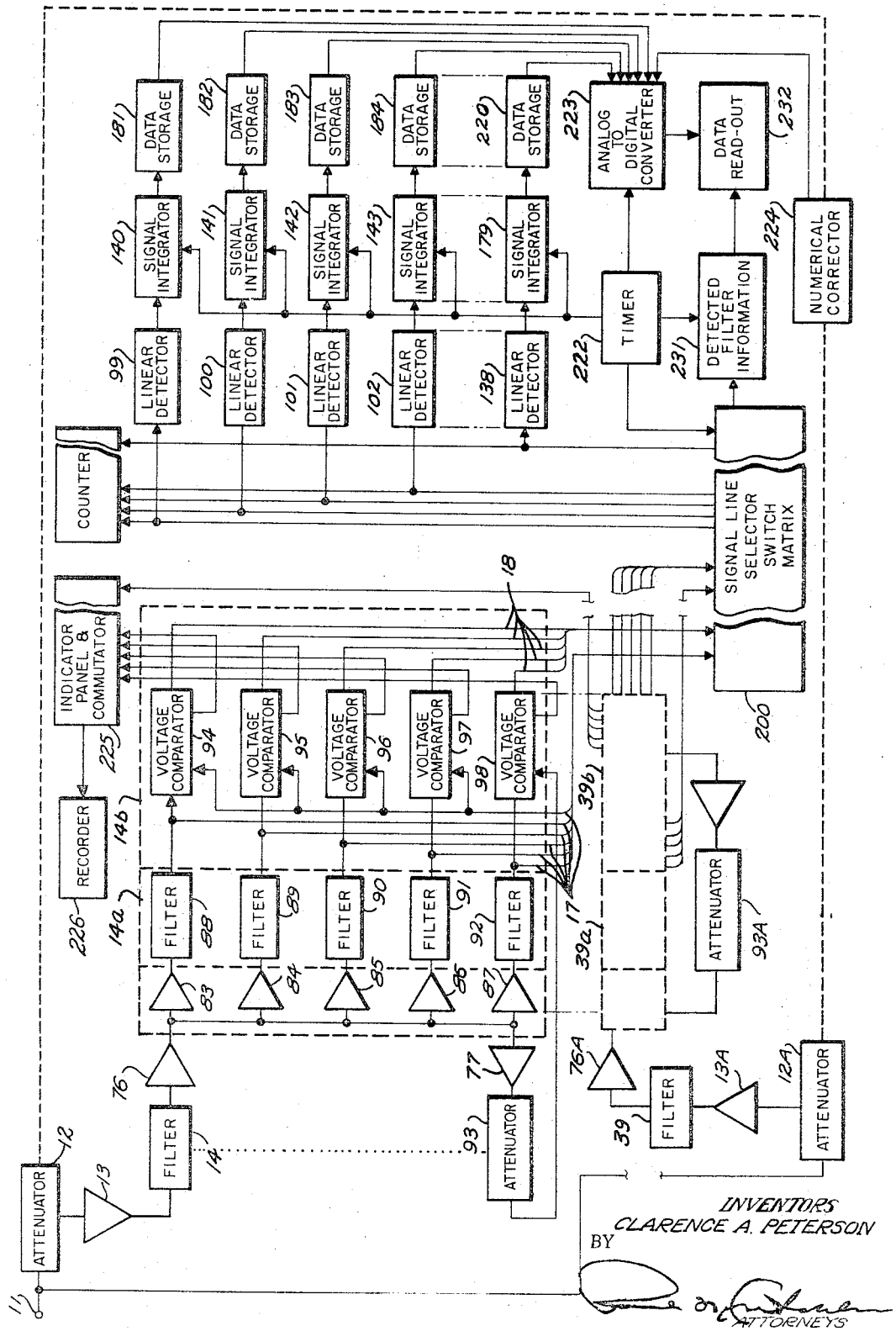

The invention described herein may be manufactured and used by or for the Government of the United States of America for governmental purposes without the payment of any royalties thereon or therefor.

The present invention relates to an automatic frequency analyzer and more particularly to an automatic frequency analyzer which utilizes contiguous narrow band filters to supply signal frequency information over a continuous spectral range to a computer having a digital readout.

According to the invention an input signal to be analyzed is passed through a plurality of contiguous one third octave filters to attenuators. Each group filter supplies a predetermined part of the entire spectrum to be analyzed to a plurality of contiguous narrow band filters for further frequency division. The output from the narrow band filters is compared in amplitude with the output from its associated one third octave filters in a comparator. A detector rectifies the output of filtered signal when detection occurs and passes the signal to an integrator where it is integrated over a predetermined period of time and programmed into an analog to digital converter.

An object of the present invention is the provision of an automatic frequency analyzer utilizing contiguous narrow band filters for frequency separation.

Another object is to provide an automatic frequency analyzer having a periodically correct digital read-out.

A further object of the invention is the provision of an automatic frequency analyzer in which specific component amplitudes are periodically read out over a predetermined frequency spectrum.

Still another object is to provide an automatic frequency analyzer which is simple, inexpensive and requires a minimum of maintenance and adjustment.

Other objects and many of the attendant advantages of this invention will be readily appreciated as the same becomes better understood by reference to the following detailed descriptions when considered in conjunction with the accompanying drawing and wherein:

The sole figure illustrates a preferred embodiment of the present invention in block diagram form.

OPERATION

Referring to the drawing, the operation will be described with reference to a particular system for analyzing a complete spectral range from 9 cycles per second to 3,000 cycles per second but it is to be understood that the invention is not limited to any particular frequency range or to any particular number of sets of filters.

An incoming signal to be analyzed is taken at input terminal 11 and passed through attenuator 12 to preamplifier 13. Attenuator 12 is set to bring the over-all amplitude of the input signal to within the amplitude range of the entire system and is designed to equally attenuate all frequencies within the spectral range to be analyzed. The entire input signal then is present at the output of amplifier 13 and is presented to a ⅓ octave filter 14. Filter 14 is designated a ⅓ octave filter since three such filters embrace an octave which in physics is defined as a frequency range lying between a first frequency and a second frequency which is twice the first frequency. For example, in the ⅓ octave filters shown below filters 14, 15 and 16 filter the octave lying between 8.9 and 17.8 cycles per second. The pass band of the invention lies between 8.9 and 3,550 cycles per second and is divided by ⅓ octave filters as follows:

⅓ Octave band

| No.: | Limits (c.p.s.) 3 db down | No.: | Limits (c.p.s.) 3 db down |
|---|---|---|---|
| 14 | 8.9–11.2 | 27 | 178–224 |
| 15 | 11.2–14.1 | 28 | 224–282 |
| 16 | 14.1–17.8 | 29 | 282–355 |
| 17 | 17.8–22.4 | 30 | 355–447 |
| 18 | 22.4–28.2 | 31 | 447–562 |
| 19 | 28.2–35.5 | 32 | 562–708 |
| 20 | 35.5–44.7 | 33 | 708–891 |
| 21 | 44.7–56.2 | 34 | 891–1120 |
| 22 | 56.2–70.8 | 35 | 1120–1410 |
| 23 | 70.8–89.1 | 36 | 1410–1780 |
| 24 | 89.1–112 | 37 | 1780–2240 |
| 25 | 112–141 | 38 | 2240–2820 |
| 26 | 141–178 | 39 | 2820–3550 |

The incoming signal is so divided into ⅓ octave signals by filters 14 to 39 (only filters 14 and 39 are shown in the drawings for simplicity). Each ⅓ octave signal is passed to amplifiers and their associated set of narrow band filters in the same manner as disclosed below regarding ⅓ octave filter 14.

Hereinafter the description will be confined to ⅓ octave filter 14 and its associated circuitry, it being understood that filters 15 through 39 and their associated circuitry are substantially identical.

The ⅓ octave signal passed by filter 14 is fed through isolation amplifiers 76 and impressed across amplifier 77 and amplifiers 83 through 87. The ⅓ octave signal is amplified in amplifier 77 and is attenuated in attenuator 93 to provide a ⅓ octave signal of predetermined magnitude. The ⅓ octave signal is also amplified by amplifiers 83 through 87 and filtered by a set 14a of narrow band filters 88 through 92 to provide a plurality of discrete narrow band signals of predetermined magnitude. Conductors 17 conduct the narrow band signals to a selector switch matrix 200.

Each of the plurality of narrow band signals is passed to a separate one of voltage comparators 94 though 98 shown as comparator set 14b wherein the magnitude of each separate narow band signal is compared with the magnitude of the ⅓ octave signal. The voltage comparators are adjusted to produce separate output signals that are passed to selector switch matrix 200 through conductors 18 only when certain ones of the narrow band signals exceeds a predetermined threshold magnitude. If there is no narrow band signal passed to a particular comparator the comparator will not produce an output pulse. If a narrow band signal is less than the predetermined threshold magnitude then the comparator will not produce an output pulse. In this manner each comparator output is selectively adjustable to provide output pulses in accordance with a desired criteria.

Upon receiving the output pulses, selector switch matrix 200 synchronously gates particular ones of the separate narrow band signals which are present on particular ones of the conductors 17 into the matrix. The gated narrow band signals are sequentially switched to one of the linear detectors 99 through 138. The sequential switching of the selector switch matrix by timer 222 creates 40 sequential channels each having its own respective time slot.

Hence, if voltage comparator 94 indicates presence of a particular narrow band signal, the associated filter output is detected in one of the forty detectors 99 integrated in its associated integrator 140, stored in storage means 181 and converted and digitized in analog digital converter 223. Timer 222 also supplies an input to integrator 140 which determines the time of integration and supplies a read-out pulse to analog to digital converter 223 for a sequential read-out from the integrator in association with digital indication of the connected filter.

To get an absolute digital read-out from analog to digital converter 223 the settings of these attenuators are mechanically coupled to numerical corrector 224 which supplies analog to digital converter 223 with compensating digits.

Corollary outputs consist of: (a) "one" or "zero" digits from each voltage comparator to an indicator panel electronic scanning switch 225. The signal lines from each of the comparators, not all of which are shown, are connected to sequential inputs of the scanner switch which scans at a rate of one scan cycle per second, providing an output on a single line whenever a "one" digit (detection by a comparator) is encountered from a comparator. This output is applied to a strip chart recorder 226 in a synchronous manner such that detection criteria from each filter always occurs at the same position on the chart papers, (b) outputs from the 40 sequential channels can be supplied to digital electronic counter circuits (not shown) which measure the exact frequency of signals on each of the lines once during each program cycle and can present the values as printed numbers on a paper tape (not shown), (c) "one" or "zero" digits from each voltage comparator to the indicator panel of indicator panel-electronic scanning switch 225 which displays the change in detection of narrow band frequencies for each filter and its associated comparator.

A provision can also be incorporated whereby an operator by dial control can eliminate "batches" of ten of the narrow band filters from the programming circuitry in increasing number sequences such that the computer amplitude versus frequency analysis can be initiated at any point of ten narrow band filters in increasing sequence from the lowest numbered to highest numbered filter. This permits amplitude investigation by the 40 computer channels to be restricted to any desired portion of the spectrum and is utilized when more than forty of the narrow band filters indicate line frequency components.

It should be understood, of course, that the foregoing disclosures relates to only a preferred embodiment of the invention and that it is intended to cover all changes, modifications of the examples of the invention herein chosen for the purpose of the disclosure which do not constitute departures from the spirit and scope of the invention.

What is claimed is:
1. A system for analyzing the frequency of an input signal comprising;
 a ⅓ octave filter for passing a signal equal to one third of an octave of said input signal;
 a set of narrow band filters connected to said ⅓ octave filter for dividing the ⅓ octave signal into a plurality of discrete narrow band signals;
 a set of voltage comparators, each connected to said ⅓ octave filter and to the output of a separate one of said set of narrow band filters for comparing the magnitude of said ⅓ octave signal to the magnitude of a separate narrow band signal and providing an output signal when the sum of the magnitudes equals a predetermined value;
 a computer having circuitry defining a plurality of time division channels; and
 a switching matrix connected to said computer, and to each said narrow band filter and its interconnected voltage comparator, said switching matrix being responsive to voltage comparator output signals to switch particular ones of said narrow band signals into said time division channels.
2. A system according to claim 1 further including;
 an attenuator connected between said ⅓ octave filter and said set of voltage comparators, said attenuator permitting selective adjustment of the ⅓ octave signal magnitude.
3 A system according to claim 2 further including;
 a plurality of contiguous ⅓ octave filters for producing a plurality of contiguous ⅓ octave signals;
 a plurality of sets of narrow band filters, each set connected to a different one of said contiguous ⅓ octave filters for defining discrete narrow band signals within the frequency range of different ones of said ⅓ octave filters;
 a plurality of sets of voltage comparators each set of voltage comparators connected to a different one of said plurality of sets of narrow band filters; and
 a plurality of attenuators each interconnecting a different of said plurality of contiguous ⅓ octave filters to a different one of said sets of voltage comparators.

References Cited

UNITED STATES PATENTS

| | | | |
|---|---|---|---|
| 2,680,228 | 6/1954 | Smith | 324—77 |
| 2,851,661 | 9/1958 | Buland | 324—77 |
| 2,926,304 | 2/1960 | Fromm | 324—77 X |
| 3,063,034 | 11/1962 | Lee | 324—77 X |
| 3,129,287 | 4/1964 | Bakis | 324—77 X |
| 3,167,710 | 1/1965 | Cox | 324—77 |
| 3,173,087 | 3/1965 | Loposer | 324—77 X |

RUDOLPH V. ROLINEC, *Primary Examiner.*

WALTER L. CARLSON, *Examiner.*

P. F. WILLE, *Assistant Examiner.*